(No Model.)

H. BRUNT.
METHOD OF SUSPENDING POTTERY ARTICLES WHILE BURNING.

No. 442,854.            Patented Dec. 16, 1890.

WITNESSES:
A. O. Balendrier.
Otto H. Ehlers.

INVENTOR:
Henry Brunt
BY Chas B. Mann
ATTORNEY.

United States Patent Office.

HENRY BRUNT, OF BALTIMORE, MARYLAND.

METHOD OF SUSPENDING POTTERY ARTICLES WHILE BURNING.

SPECIFICATION forming part of Letters Patent No. 442,854, dated December 16, 1890.

Application filed February 7, 1889. Serial No. 299,074. (No model.)

*To all whom it may concern:*

Be it known that I, HENRY BRUNT, a citizen of the United States, residing at Baltimore, in the State of Maryland, have invented certain new and useful Improvements in Wash-Bowls and similar Articles of Pottery-Ware, of which the following is a specification.

The object of this invention is to provide wash-bowls and pottery articles of similar shape with side projections or cavities for the engagement of the sagger-pins, whereby when the bowl is being burned it may be suspended bottom uppermost.

Figure 1:
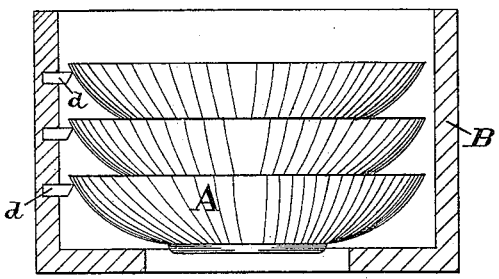

Heretofore it has been the custom to suspend wash-bowls and other similar articles of pottery-ware on the points of three earthenware pins, with the mouth of the bowl uppermost, as shown in Figure 1. This manner of supporting the bowl is objectionable, as any foreign substance—such as sagger-dirt, &c—falling within the rim of the bowl would descend to the inside, and when the glaze fused in the kiln this dirt or other foreign substance would become annealed to the surface of the bowl, and thus spoil or at least blemish the bowl. Another objection is that during the burning of the kiln, when the body of the goods is heated almost to the melting-point, the whole weight of the bowl hanging from the three pins under the rim of the bowl is liable to, and a great many do, sag and get crooked or bent out of their proper shape, and are thus spoiled.

By my invention the bowl may be kept straight and clean during burning by turning the bottom uppermost and suspending it by the projections or cavities on the side.

The invention is illustrated in the accompanying drawings, in which—

Figure 2:
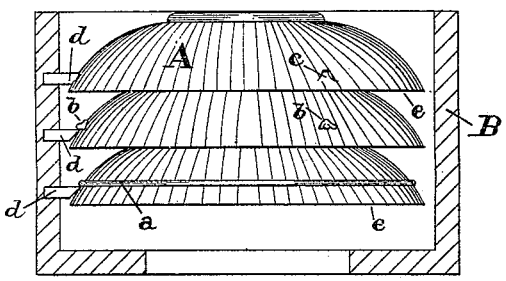
Figure 3:
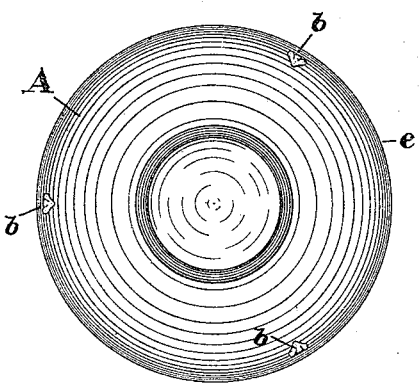
Figure 4:
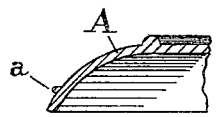
Figure 5:

Fig. 1 is a sectional view of an ordinary sagger and a side view of bowls suspended in the ordinary manner. Fig. 2 is a similar view showing my improved bowls suspended. Fig. 3 is a bottom view of the bowl. Figs. 4 and 5 are partial views of a bowl, showing modifications of the improvement.

The letter A designates a wash-bowl or similar article of pottery-ware. This article has a greater diameter across the top rim than elsewhere.

The sagger is designated by the letter B, and pins $d$ project from the inner walls of the sagger and support the bowl.

The wash-bowl is provided on its exterior below but near the top rim $e$ with three small lugs or projections $b$. These have positions equidistant from each other. When the bowl is inverted, as in Fig. 2, these small lugs or projections rest on the pins $d$ in the sagger. Bowls or other articles placed in this position while being burned will keep free of any falling particles of dirt and will keep straight or preserve their true shape, because the inverted bowl forms a dome or arch which has strength to resist the inclination to collapse that is liable to ensue when placed in the other position. (Shown in Fig. 1.)

Instead of the lugs $b$, the bowl may have a continuous projecting swell, ring, or bead $a$, or it may have cavities $c$. Either of these will rest on the sagger-pins $d$, and thus support the bowl.

By supporting the bowl at a point just below the top rim the sagger-pins need not be any longer than those ordinarily used, and the top or edge of the rim is left smooth and even, which might not be the case if the top of the rim rested upon the pins, as the glaze would be indented by the pins and roughened thereby.

Bowls thus provided will be clear of all internal blemishes and will have correct shape and form.

Having described my invention, I claim—

1. The herein-described method of burning wash-bowls and similarly-shaped articles, consisting in supporting them in an inverted position within the glost, the point of support being just below but near the top rim of the bowl, and applying heat thereto, substantially as described.

2. A wash-bowl or similarly-shaped article, the outer surface of which is provided with three projections just below but near the top rim for supporting it in an inverted position within the glost, substantially as described.

HENRY BRUNT.

Witnesses:
G. W. BROWNLEY,
E. HUSTON BENNETT.